(12) United States Patent
Weiss et al.

(10) Patent No.: US 11,663,939 B1
(45) Date of Patent: May 30, 2023

(54) AUGMENTED REALITY HEAD-UP DISPLAY FOR GENERATING A CONTEXTUAL GRAPHIC SIGNIFYING A VISUALLY OCCLUDED OBJECT

(71) Applicant: GM Global Technology Operations LLC, Detroit, MI (US)

(72) Inventors: John P. Weiss, Shelby Township, MI (US); Joseph F. Szczerba, Grand Blanc, MI (US); Omer Tsimhoni, Bloomfield Hills, MI (US); Jeffrey Rupert Cooke, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/702,320

(22) Filed: Mar. 23, 2022

(51) Int. Cl.
*G09G 3/00* (2006.01)
*G06V 20/58* (2022.01)
(Continued)

(52) U.S. Cl.
CPC .............. *G09G 3/001* (2013.01); *B60K 35/00* (2013.01); *G02B 27/0101* (2013.01); *G06V 20/58* (2022.01); *B60K 2370/1529* (2019.05); *B60K 2370/166* (2019.05); *B60K 2370/167* (2019.05); *B60K 2370/168* (2019.05); *B60K 2370/177* (2019.05); *B60K 2370/21* (2019.05);
(Continued)

(58) Field of Classification Search
CPC .............. G09G 3/001; G09G 2340/04; G09G 2354/00; G09G 2380/10; B60K 35/00; B60K 2370/1529; B60K 2370/166; B60K 2370/167; B60K 2370/168; B60K 2370/177; B60K 2370/21; B60K 2370/52; B60K 2370/736; B60K 2370/741; G02B 27/0101; G02B 2027/0138; G02B 2027/141; G06V 20/58
See application file for complete search history.

(56) References Cited

U.S. PATENT DOCUMENTS

2010/0253918 A1* 10/2010 Seder ................... G01S 13/867
353/13
2014/0019005 A1* 1/2014 Lee ....................... G08G 1/0962
701/301
(Continued)

*Primary Examiner* — Brent D Castiaux
(74) *Attorney, Agent, or Firm* — Vivacqua Crane PLLC

(57) ABSTRACT

An augmented reality head-up display system for displaying graphics upon a windscreen of a vehicle includes one or more image-capturing devices that capture image data of an environment surrounding the vehicle, a graphic projection device for generating images upon the windscreen of the vehicle, and a controller in electronic communication with the one or more image-capturing devices and the graphic projection device. The controller executes instructions to receive object detection data indicating a current position of objects located within the environment surrounding the vehicle. The controller executes instructions to compare the current position of the objects within the environment with a visual location of the objects within the environment determined based on the image data to identify a visually occluded object located within the environment. In response to identifying the visually occluded object, the controller determines a contextual graphic that signifies the visually occluded object.

19 Claims, 5 Drawing Sheets

(51) Int. Cl.
  *G02B 27/01*   (2006.01)
  *B60K 35/00*   (2006.01)
(52) U.S. Cl.
  CPC .... *B60K 2370/52* (2019.05); *B60K 2370/736* (2019.05); *B60K 2370/741* (2019.05); *G02B 2027/0138* (2013.01); *G02B 2027/0141* (2013.01); *G09G 2340/04* (2013.01); *G09G 2354/00* (2013.01); *G09G 2380/10* (2013.01)

(56) References Cited

U.S. PATENT DOCUMENTS

| | | | |
|---|---|---|---|
| 2014/0063064 A1* | 3/2014 | Seo | G08G 1/163 345/633 |
| 2018/0059779 A1* | 3/2018 | Sisbot | G06T 19/20 |
| 2018/0101736 A1* | 4/2018 | Han | G08G 1/017 |

\* cited by examiner

AUGMENTED REALITY HEAD-UP DISPLAY FOR GENERATING A CONTEXTUAL GRAPHIC SIGNIFYING A VISUALLY OCCLUDED OBJECT

INTRODUCTION

The present disclosure relates to an augmented reality head-up display for generating a contextual graphic that is displayed upon a windscreen of a vehicle, where the contextual graphic signifies a visually occluded object located in an environment surrounding the vehicle.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness.

However, while current augmented reality head-up displays achieve their intended purpose, there is a need in the art for an improved approach for providing information to vehicle occupants.

SUMMARY

According to several aspects, an augmented reality head-up display system for displaying graphics upon a windscreen of a vehicle. The augmented reality head-up display system includes one or more image-capturing devices that capture image data of an environment surrounding the vehicle, a graphic projection device for generating images upon the windscreen of the vehicle, and a controller in electronic communication with the one or more image-capturing devices and the graphic projection device. The controller executes instructions to receive object detection data indicating a current position of objects located within the environment surrounding the vehicle. The controller executes instructions to compare the current position of the objects within the environment with a visual location of the objects within the environment determined based on the image data to identify a visually occluded object located within the environment. In response to identifying the visually occluded object, the controller executes instructions to determine a contextual graphic that signifies the visually occluded object and instruct the graphic projection device to generate the contextual graphic upon the windscreen of the vehicle.

In an aspect, a blocking object is located along a line-of-sight of a driver of the vehicle to obstruct the visually occluded object.

In another aspect, the contextual graphic is overlaid at a specific position upon the windscreen, and where the visually occluded object is visible at the specific position on the windscreen once a line-of-sight of a driver of the vehicle is no longer occluded.

In yet another aspect, the graphic projection device displays graphics upon a near-field image plane and a far-field image plane of the windscreen.

In an aspect, the augmented reality head-up display system including an eye location system in electronic communication with the controller.

In another aspect, the controller executes instructions to receive driver perception data from the eye location system and determine a location of a head of a driver of the vehicle and a gaze location based on the driver perception data.

In yet another aspect, the controller executes instructions to determine, based on the driver perception data, that an out-of-range object is presently outside of a field-of-view of the driver of the vehicle, and in response to determining the out-of-range object, the controller instructs the graphic projection device to generate the contextual graphic along a boundary of the far-field image plane.

In an aspect, the out-of-range object first becomes visible at the boundary of the far-field image plane.

In another aspect, the controller executes instructions to determine, based on the driver perception data, that the visually occluded object is within a field-of-view of a driver of the vehicle, and in response to determining the visually occluded object is within the field-of-view of the driver of the vehicle, instruct the graphic projection device to generate the contextual graphic as a conformal graphic.

In yet another aspect, the controller executes instructions to continually adjust a perspective and a size of the conformal graphic in real-time to conform to the environment surrounding the vehicle.

In an aspect, the controller instructs the graphic projection device of the augmented reality head-up display system to project cluster content information within a near-field image plane of the windscreen.

In another aspect, information regarding the contextual graphic is displayed within a near-field image plane.

In yet another aspect, the controller executes instructions to receive, from one or more vehicle systems, a notification indicating the vehicle is about to perform a maneuver, and in response to receiving the notification, check for visually occluded objects within the environment surrounding the vehicle in response to receiving the notification from the one or more vehicle systems.

In an aspect, the contextual graphic includes one or more of the following: symbols, text, and images.

In another aspect, the contextual graphic is a traffic light, and wherein the traffic light appears to change lighting colors to communicate a status of the traffic light.

In an aspect, a method for displaying graphics upon a windscreen of a vehicle by an augmented reality head-up display system is disclosed. The method includes receiving, by a controller, object detection data indicating a current position of objects located within an environment surrounding the vehicle. The method also includes receiving, by the controller, image data from one or more image-capturing devices that capture image data of the environment surrounding the vehicle. The method further includes comparing, by the controller, the current position of the objects within the environment with a visual location of the objects within the environment determined based on image data to identify a visually occluded object located within the environment. In response to identifying the visually occluded object, the method includes determine a contextual graphic that signifies the visually occluded object. Finally, the method includes instructing a graphic projection device to generate the contextual graphic upon the windscreen of the vehicle a graphic projection device for generating images upon the windscreen of the vehicle.

In an aspect, an augmented reality head-up display system for displaying graphics upon a windscreen of a vehicle. The augmented reality head-up display system includes one or more image-capturing devices that capture image data of an environment surrounding the vehicle, a graphic projection device for generating images upon the windscreen of the vehicle, and a controller in electronic communication with the one or more image-capturing devices and the graphic projection device. The controller executes instructions to receive object detection data indicating a current position of objects located within the environment surrounding the vehicle. The controller compares the current position of the objects within the environment with a visual location of the objects within the environment determined based on the image data to identify a visually occluded object located within the environment. In response to identifying the visually occluded object, the controller determines a contextual graphic that signifies the visually occluded object. The controller instructs the graphic projection device to generate the contextual graphic upon the windscreen of the vehicle, wherein the contextual graphic is overlaid at a specific position upon the windscreen, and where the visually occluded object is visible at the specific position on the windscreen once a line-of-sight of a driver of the vehicle is no longer occluded.

In another aspect, the graphic projection device displays graphics upon a near-field image plane and a far-field image plane of the windscreen.

In yet another aspect, an eye location system in electronic communication with the controller, and the controller executes instructions to receive driver perception data from the eye location system, and determine a location of a head of a driver of the vehicle and a gaze location based on the driver perception data.

In an aspect, the controller executes instructions to determine, based on the driver perception data, that an out-of-range object is presently outside of a field-of-view of the driver of the vehicle, and in response to determining the out-of-range object, instruct the graphic projection device to generate the contextual graphic along a boundary of the far-field image plane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
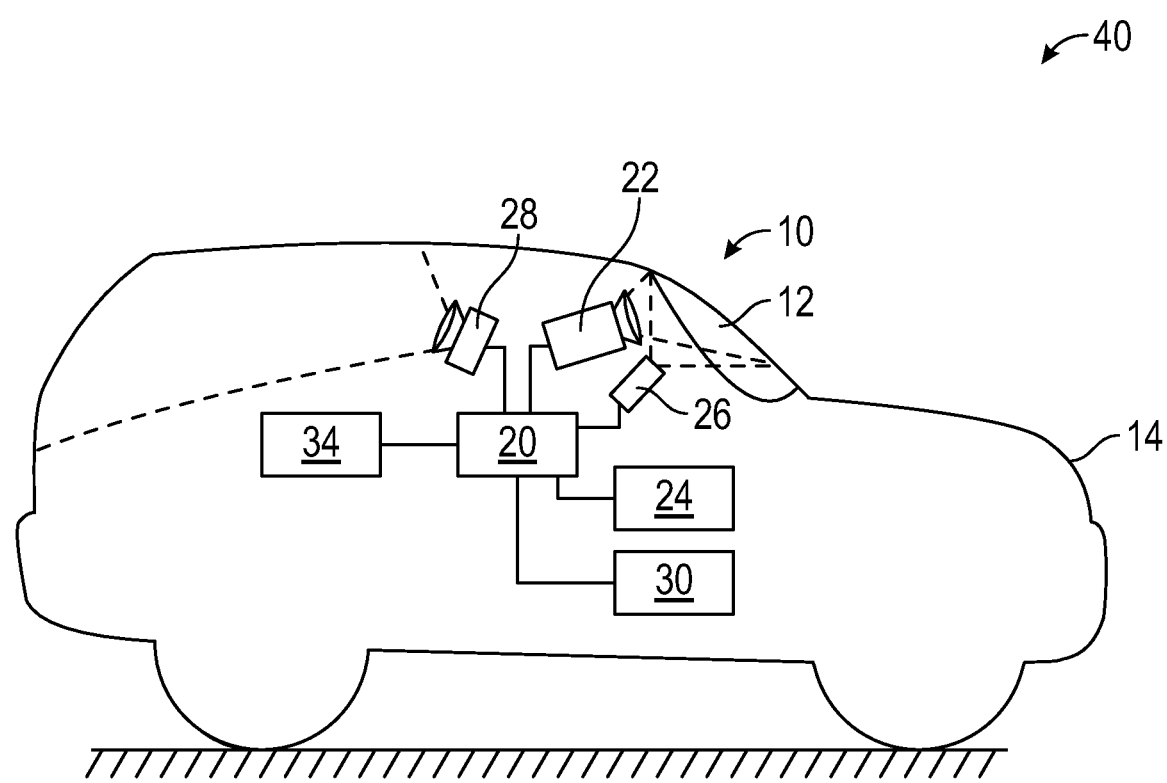
FIG. 1 is a schematic diagram of the disclosed augmented reality head-up display system for displaying graphics upon a windscreen of a vehicle, according to an exemplary embodiment

Referring to FIG. 1, an exemplary augmented reality head-up display system 10 for displaying graphics upon a windscreen 12 of a vehicle 14 is illustrated. The augmented reality head-up display system 10 includes one or more controllers 20 in electronic communication with one or more image-capturing devices 22, one or more non-visual object detection sensors 24, a graphic projection device 26, an eye location system 28, and one or more sources of object detection data 30. The image-capturing devices 22 may be cameras that obtain periodic or sequential images. The one or more non-visual object detection sensors 24 are configured to detect objects in an environment 40 surrounding the vehicle 14 and may include sensors such as, but not limited to, radar, LiDAR, and infrared sensors. It is to be appreciated that the vehicle 14 may be any type of vehicle such as, but not limited to, a sedan, truck, sport utility vehicle, van, or motor home. In an embodiment, the vehicle 14 is an autonomous or semi-autonomous vehicle, however, it is to be appreciated that manually-driven vehicles may also include the disclosed augmented reality head-up display system 10.

The graphic projection device 26 is configured to generate images upon the windscreen 12 of the vehicle 14 and includes a projection device for creating an excitation light for projecting images. The eye location system 28 includes one or more sensors for determining the location of a head of the driver of the vehicle 14 as well as the orientation or gaze location of the driver's eyes. The one or more sources of object detection data 30 include, but are not limited to, an external vehicle network, a global positioning system (GPS), and roadway databases. Some types of external vehicle networks include, but are not limited to, cellular networks and vehicle-to-infrastructure (V2X) networks. The object detection data includes information indicating a position, velocity, and direction of travel of objects in the environment 40 surrounding the vehicle 14. The controller 20 is also in electronic communication with a plurality of vehicle systems 34. The plurality of vehicle systems 34 include, but are not limited to, a driver monitoring system (DMS) and an automated driving system.

Figure 2A:
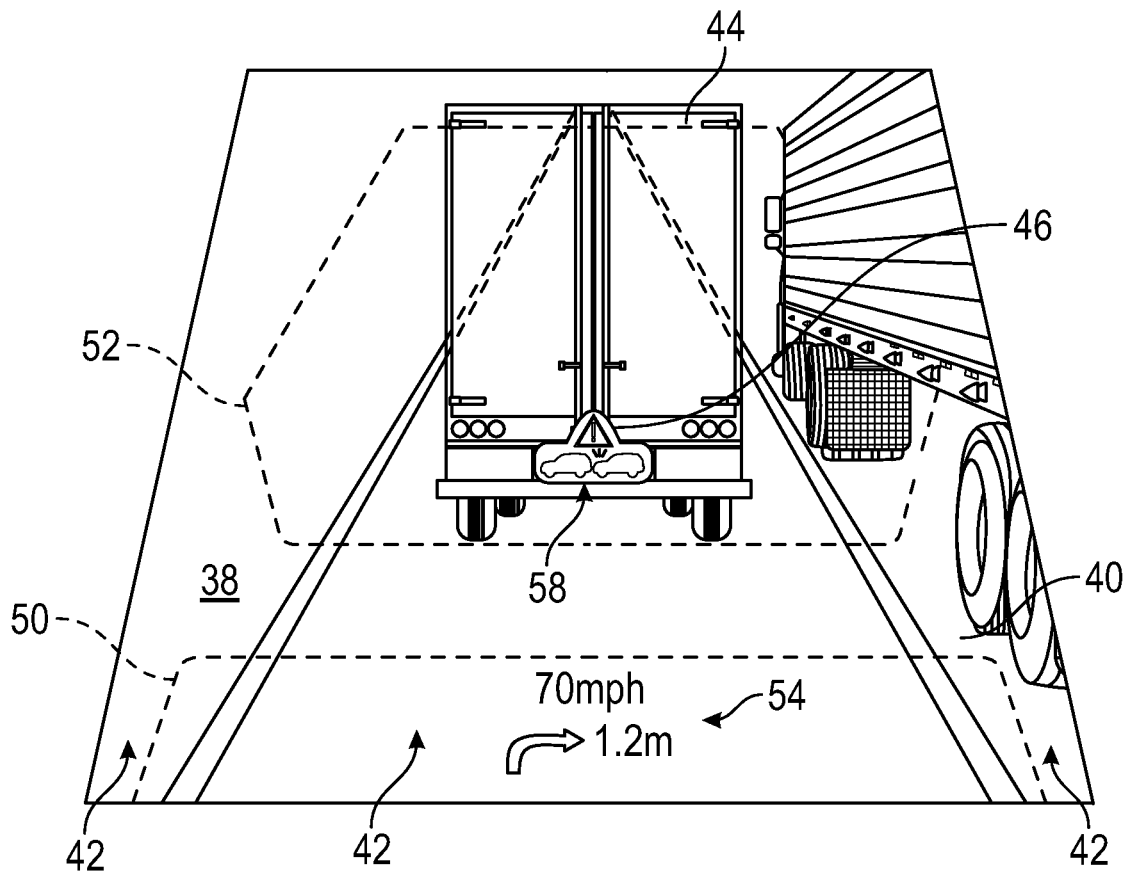
FIG. 2A illustrates an interior view of the windscreen illustrating a contextual graphic that signifies a visually occluded object located in an environment surrounding the vehicle, according to an exemplary embodiment.

FIG. 2A is an exemplary interior view of the windscreen 12, where the environment 40 surrounding the vehicle 14 is visible through the windscreen 12. Referring to both FIGS. 1 and 2A, the augmented reality head-up display system 10 identifies a visually occluded object located in the environment 40 surrounding the vehicle 14. The visually occluded object is any type of incident or object situated along a roadway 38 that the vehicle 14 travels along. The visually occluded object is not visible to the driver of the vehicle 14 because one or more blocking objects 44 that are located along a line-of-sight of the driver obstruct or block the view of the visually occluded object. In the example as shown in FIG. 2A, the visually occluded object is a traffic incident involving two or more vehicles and the blocking object 44 is a semi-truck, however, it is to be appreciated that FIG. 2A is merely exemplary in nature. Indeed, the blocking object 44 may be any object located in the environment such as, for example, another vehicle, environmental objects such as trees or geographical features such as mountains. Some examples of visually occluded objects include, but are not limited to, roadway signage and markings, another vehicle, a pedestrian, a bicyclist, a traffic incident, an oncoming vehicle, or road conditions that require attention. Some examples of road conditions that require attention include, but are not limited to, icy or slippery road surfaces, potholes, debris obstructing the roadway 38, and construction zones that have lane closures.

Figure 2B:
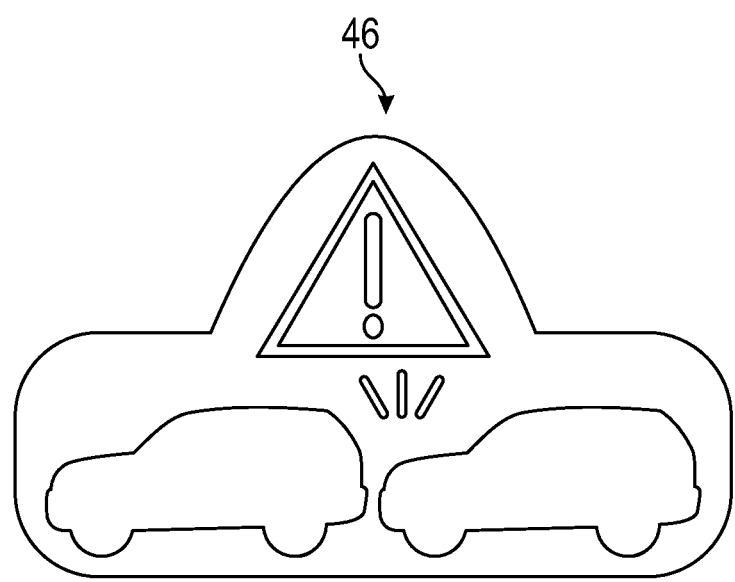
FIG. 2B is an enlarged view of the contextual graphic shown in FIG. 2A, according to an exemplary embodiment.

As explained below, in response to identifying the visually occluded object, the augmented reality head-up display system 10 determines a contextual graphic 46 that signifies the visually occluded object. As seen in FIGS. 2A and 2B, the contextual graphic 46 is generated upon the windscreen 12 of the vehicle 14 and is overlaid at a specific position 58 upon the windscreen 12. It is to be appreciated that the visually occluded object is visible at the specific position 58 on the windscreen 12 once a line-of-sight of the driver of the vehicle 14 is no longer occluded by the blocking object 44. In other words, if the semi-truck shown in FIG. 2A were to move into a lane 42 to the left, then the visually occluded object (i.e., the traffic incident) would be visible to the driver.

Figure 3A:
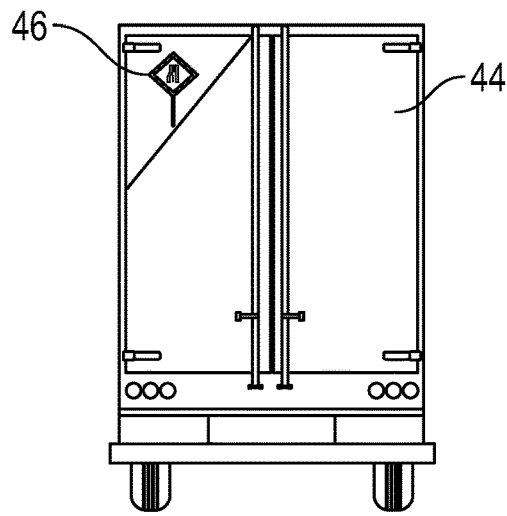
FIGS. 3A-3C illustrate the contextual graphic as a conformal graphic, where a perspective and a size of the conformal graphic is adjusted in real-time to conform to the environment surrounding the vehicle, according to an exemplary embodiment.
Figure 3B:
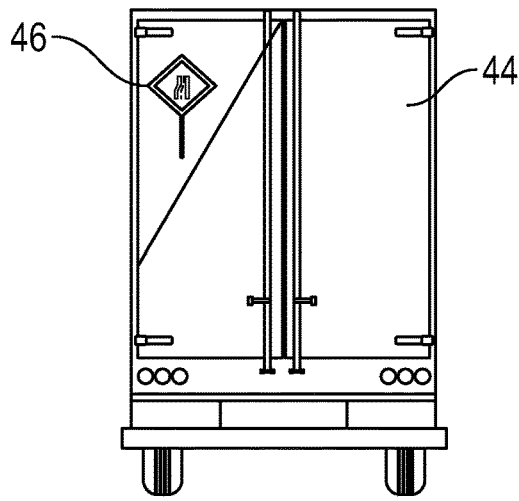
Figure 3C:
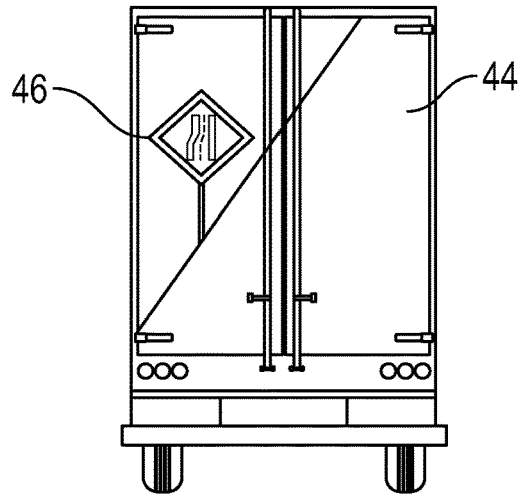

The contextual graphic 46 includes symbols, text, and images to represent the visually occluded object. In the example as shown in FIGS. 2A and 2B, the contextual graphic 46 is a symbol indicating a traffic collision between two vehicles, however, it is to be appreciated that other types of symbols may be used as well. For example, the contextual graphic may be a caution symbol indicating road conditions that require attention. In an embodiment, the contextual graphic 46 may include a words conveying a message as well. For example, the contextual graphic 46 may be a caution symbol along with the message "black ice ahead, slow down and watch out". In the embodiment as shown in FIGS. 3A-3C, the contextual graphic 46 is a conformal graphic, where a perspective and a size of the conformal graphic is adjusted in real-time to conform to the environment 40 surrounding the vehicle 14. For example, in the example as shown in FIGS. 3A-3C, the conformal graphic is a roadway sign that changes perspective and size as the roadway sign approaches the vehicle 14.

Referring to FIGS. 1 and 2A, the windscreen 12 includes a first, near-field image plane 50 and a second, far-field image plane 52. The controller 20 instructs the graphic projection device 26 of the augmented reality head-up display system 10 to project cluster content information 54 upon the windscreen 12 within the near-field image plane 50. The cluster content information 54 informs the driver of the vehicle 14 of driving conditions such as, but not limited to, vehicle speed, speed limit, gear position, fuel level, current position, and navigational instructions. In the example as shown in FIG. 2A, the cluster content information 54 includes vehicle speed and navigational directions. In an embodiment, the augmented reality head-up display system 10 projects information regarding the contextual graphic 46 upon the windscreen 12 within the near-field image plane 50. Some examples of information regarding the contextual graphic 46 include a description of the visually occluded object (i.e., is the visually occluded object debris on the roadway 38, another vehicle, a road sign, etc.) and a distance to the visually occluded object from the vehicle 14.

The controller 20 instructs the graphic projection device 26 to project the contextual graphic 46 upon the windscreen 12 within the far-field image plane 52, where the contextual graphic 46 is and is overlaid at the position 58 upon the windscreen 12, where the visually occluded object is visible to the driver of the vehicle 14 at the position 58 once the blocking object 44 is moved and no longer obstructs the driver's line-of-sight to the visually occluded object. The far-field image plane 52 contains images overlaid upon the roadway 38 that are visible through the windscreen 12. In the embodiment as shown in FIG. 2A, the far-field image plane 52 only covers a portion of the entire plane of the windscreen 12, however, it is to be appreciated that in another implementation the far-field image plane 52 may cover the entire plane of the windscreen 12 that is not occupied by the near-field image plane 50. Moreover, although FIG. 2A illustrates the far-field image plane 52 only spanning across a portion of the lanes 42 that are part of the roadway 38, in embodiments the far-field image plane 52 spans across each lane 42 across the roadway 38.

Referring to FIGS. 1 and 2A, the controller 20 receives the object detection data indicating a position, velocity, and direction of travel of objects within the environment 40 surrounding the vehicle 14 from the one or more sources of object detection data 30. The controller 20 also receives image data from the one or more image-capturing devices 22. The controller 20 compares a current location of the objects within the environment 40 determined based on the object detection data with a visual location of the objects within the environment 40 determined based on the image data to identify the visually occluded object. As mentioned above, the visually occluded object is visible once the blocking object 44 is no longer located along the line-of-sight of the driver of the vehicle 14. In response to identifying the visually occluded object, the controller 20 determines the contextual graphic 46 that signifies the visually occluded object, and then instructs the graphic projection device 26 to generate the contextual graphic 46 upon the windscreen 12 of the vehicle 14.

Figure 4:
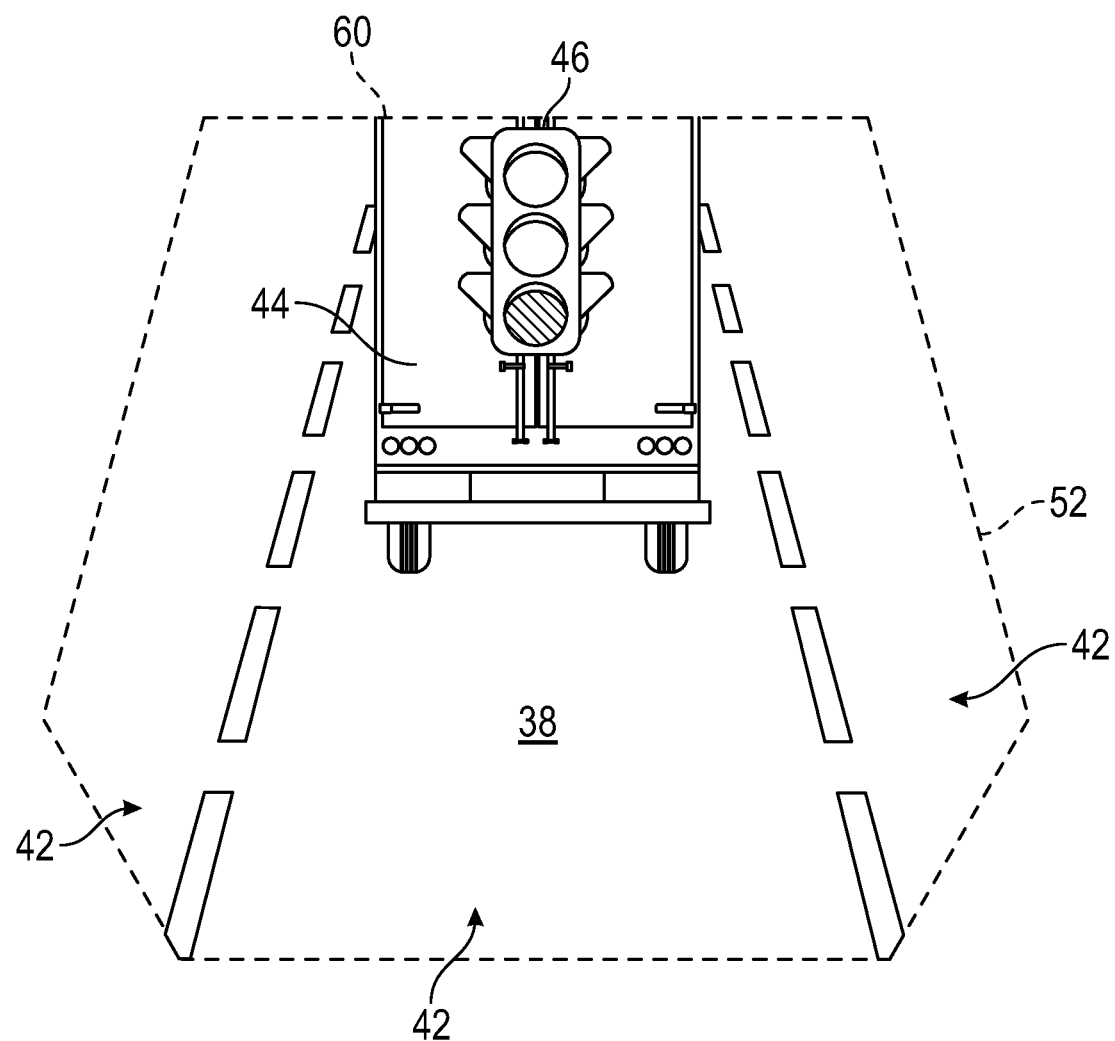
FIG. 4 illustrates a far-field image plane of the windscreen shown in FIG. 2, according to an exemplary embodiment.

FIG. 4 illustrates the far-field image plane 52, where the contextual graphic 46 is generated directly adjacent to a boundary 60 of the far-field image plane 52. In the example as shown in FIG. 4, the contextual graphic 46 is a traffic light. Referring to FIGS. 1, 2A and 4, the controller 20 receives the driver perception data from the eye location system 28 and determines the location of the head of the driver of the vehicle 14 and a gaze location based on the driver perception data. In embodiments, the controller 20 determines, based on the driver perception data, that the visually occluded object is an out-of-range object presently outside of a field-of-view of the driver of the vehicle 14, but is approaching the field-of-view of the driver. That is, referring to FIG. 4, even if the blocking object 44 (i.e., the semi-truck) were to move into an adjacent lane 42, the visually occluded object (i.e., the traffic light) would be at a distance far enough away that the driver of the vehicle 14 would be unable to view the traffic light through the windscreen 12. However, as the vehicle 14 travels along the roadway 38, the traffic light eventually becomes visible. In response to determining the out-of-range object, the controller 20 instructs the graphic projection device 26 to generate the contextual graphic 46 along the boundary 60 of the far-field image plane 52, where the out-of-range object will first become visible at the boundary 60 of the far-field image plane 52. For example, as seen in FIG. 4, the traffic light would first be visible at the boundary 60 of the far-field image plane 52.

In an embodiment, the controller 20 may receive data from an external vehicle network such as a V2X indicating a traffic light status of the visually occluded object. In an embodiment, the controller 20 instructs the graphic projection device 26 to modify the contextual graphic 46 to communicate a status of the traffic light indicator. In one non-limiting embodiment, the status of the traffic light indicator includes green, yellow, and red, and the traffic light shown upon the windscreen 12 appears to change lighting colors to communicate a status of the traffic light.

Referring to FIGS. 1, 2A and 3A-3C, in embodiments the controller 20 determines, based on the driver perception data, that the visually occluded object is within the field-of-view of the driver of the vehicle 14. In response to determining the visually occluded object is within the field-of-view of the driver of the vehicle 14, in an embodiment the contextual graphic 46 is displayed as a conformal graphic that is continually adjusted in real-time to conform to the perspective of the environment surrounding the vehicle 14. As shown in FIG. 3A-3C, the conformal graphic 46 is a roadway sign that is located at an initial distance away from the vehicle 14. As the roadway sign approaches the vehicle 14, the perspective and the size of the conformal graphic is updated in real-time to match what the driver would see if the blocking object 44 (i.e., the semi-truck) were moved.

Referring back to FIGS. 1 and 2A, in an embodiment the controller 20 checks for visually occluded objects within the environment 40 in response to receiving a notification from one or more vehicle systems 34, where the notification indicates the vehicle 14 is about to perform a maneuver. The maneuver may be, for example, passing a vehicle. For example, the notification may indicate that the automated driving system plans to perform a maneuver. Alternatively, the notification is may be generated by the driver's actions. In the present example, the driver may activate a turn signal indicating he or she about to begin performing a passing maneuver. The passing maneuver may also be inferred based on information such as, for example, the lane position, speed, acceleration, distance from a vehicle ahead, and trajectory of the vehicle 14. In one embodiment, the visually occluded object is an oncoming vehicle and the controller 20 receives a notification that the vehicle 14 is about to perform a maneuver that interferes with the path of the oncoming vehicle. In this embodiment, the controller 20 instructs the graphic projection device 26 to generate the contextual graphic 46 in response to receiving the notification that the vehicle 14 is about to perform a maneuver that interferes with the path of the oncoming vehicle. In embodiments, the contextual graphic 46 may include highlighting an occluded oncoming vehicle, highlighting and/or marking lane lines with color, and/or applying text indicating the maneuver may interfere with the path of the oncoming vehicle. For example, the contextual graphic 46 may include text stating "do not pass".

Figure 5:
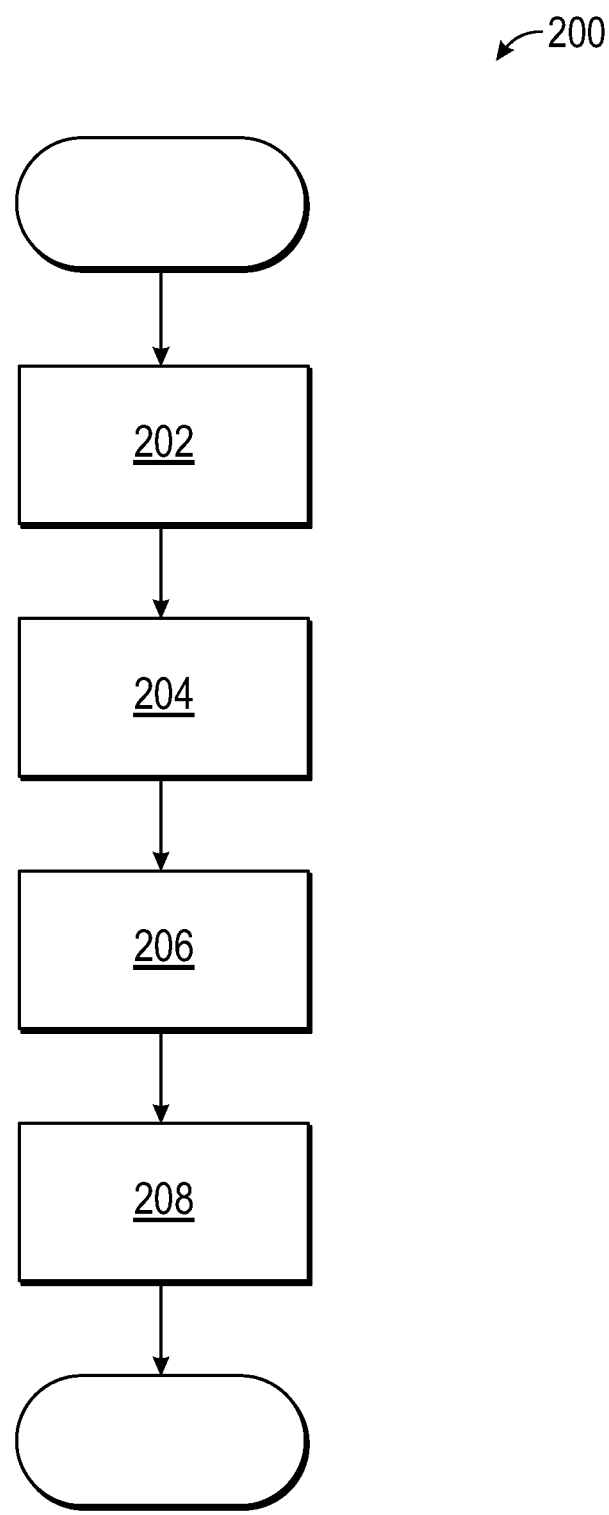
FIG. 5 is a process flow diagram illustrating a method for displaying graphics upon the windscreen of the vehicle by the augmented reality head-up display system, according to an exemplary embodiment.

FIG. 5 is a process flow diagram illustrating a method 200 for displaying graphics upon the windscreen 12 of the vehicle 14 by the augmented reality head-up display system 10. Referring generally to FIGS. 1, 2A, and 5, the method 200 may begin at block 202. In block 202, the controller 20 receives object detection data indicating the current position of objects located within the environment 40 surrounding the vehicle 14 from the one or more sources of object detection data 30. The controller 20 also receives image data from the one or more image-capturing devices 22. The method 200 may then proceed to block 204.

In block 204, the controller 20 compares the current position of the objects within the environment 40 with a visual location of the objects within the environment 40 determined based on the image data to identify the visually occluded object. As explained above, in embodiments the controller 20 determines, based on the driver perception data received from the eye location system 28, that the visually occluded object is within the field-of-view of the driver of the vehicle 14. In the alternative, the controller 20 determines, based on the driver perception data received from the eye location system 28, that that the visually occluded object is an out-of-range object presently outside of a field-of-view of the driver of the vehicle 14. The method 200 may then proceed to block 206.

In block 206, in response to identifying the visually occluded object, the controller 20 determine the contextual graphic 46 that signifies the visually occluded object. As mentioned above, in an embodiment the controller 20 determines the visually occluded object is within the field-of-view of the driver, and in response to determining the visually occluded object is within the field-of-view of the driver of the vehicle 14, the contextual graphic 46 is displayed as a conformal graphic that is continually adjusted in real-time to conform to the perspective of the environment surrounding the vehicle 14 (illustrated in FIG. 3A-3C). Alternatively, the controller 20 determines that that the visually occluded object is an out-of-range object presently outside of a field-of-view of the driver of the vehicle 14. In response to determining the out-of-range object, the controller 20 instructs the graphic projection device 26 to generate the contextual graphic 46 along a boundary 60 of the far-field image plane 52 (seen in FIG. 4). The method 206 may then proceed to block 208.

In block 208, the controller 20 instructs the graphic projection device 26 to generate the contextual graphic 46 upon the windscreen 12 of the vehicle 14. The method 200 may then terminate.

Referring generally to the figures, the disclosed augmented reality head-up display provides various technical effects and benefits. Specifically, the disclosed augmented reality head-up display system generates a contextual graphic upon the windscreen of a vehicle that signifies a visually occluded object. In embodiments, the contextual graphic is a conformal graphic, where the size and perspective of the contextual graphic displayed upon the windscreen is continually updated in real-time. In embodiments, the augmented reality head-up display system may be activated in response to receiving a notification from the vehicle's automated driving system, where the notification indicates the vehicle is about to perform a maneuver. Accordingly, the augmented reality head-up display system may provide situational awareness to the vehicle occupants and thereby enhances the occupant's trust in autonomous vehicles.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An augmented reality head-up display system for displaying graphics upon a windscreen of a vehicle, the augmented reality head-up display system comprising:
   one or more image-capturing devices that capture image data of an environment surrounding the vehicle;
   a graphic projection device for generating images upon the windscreen of the vehicle, wherein the graphic projection device displays graphics upon a near-field image plane and a far-field image plane;
   an eye location system; and
   a controller in electronic communication with the eye location system the one or more image-capturing devices, and the graphic projection device, wherein the controller executes instructions to:
      receive object detection data indicating a current position of objects located within the environment surrounding the vehicle;
      compare the current position of the objects within the environment with a visual location of the objects within the environment determined based on the image data to identify a visually occluded object located within the environment;
      in response to identifying the visually occluded object, determine a contextual graphic that signifies the visually occluded object;
      instruct the graphic projection device to generate the contextual graphic upon the windscreen of the vehicle;
      receive driver perception data from the eye location system;
      determine a location of a head of a driver of the vehicle and a gaze location based on the driver perception data;
      determine, based on the driver perception data, that an out-of-range object is presently outside of a field-of-view of the driver of the vehicle; and
      in response to determining the out-of-range object, instruct the graphic projection device to generate the contextual graphic along a boundary of the far-field image plane, wherein the out-of-range object first becomes visible at the boundary of the far-field image plane.

2. The augmented reality head-up display system of claim 1, wherein a blocking object is located along a line-of-sight of a driver of the vehicle to obstruct the visually occluded object.

3. The augmented reality head-up display system of claim 1, wherein the contextual graphic is overlaid at a specific position upon the windscreen, and wherein the visually occluded object is visible at the specific position on the windscreen once a line-of-sight of a driver of the vehicle is no longer occluded.

4. The augmented reality head-up display system of claim 1, wherein the out-of-range object first becomes visible at the boundary of the far-field image plane.

5. The augmented reality head-up display system of claim 1, wherein the controller executes instructions to:
   determine, based on the driver perception data, that the visually occluded object is within a field-of-view of a driver of the vehicle; and
   in response to determining the visually occluded object is within the field-of-view of the driver of the vehicle, instruct the graphic projection device to generate the contextual graphic as a conformal graphic.

6. The augmented reality head-up display system of claim 5, wherein the controller executes instructions to:
   continually adjust a perspective and a size of the conformal graphic in real-time to conform to the environment surrounding the vehicle.

7. The augmented reality head-up display system of claim 2, wherein the controller instructs the graphic projection device of the augmented reality head-up display system to project cluster content information within the near-field image plane of the windscreen.

8. The augmented reality head-up display system of claim 2, wherein information regarding the contextual graphic is displayed within the near-field image plane.

9. The augmented reality head-up display system of claim 1, wherein the controller executes instructions to:
   receive, from one or more vehicle systems, a notification indicating the vehicle is about to perform a maneuver; and
   in response to receiving the notification, check for visually occluded objects within the environment surrounding the vehicle in response to receiving the notification from the one or more vehicle systems.

10. The augmented reality head-up display system of claim 1, wherein the contextual graphic includes one or more of the following: symbols, text, and images.

11. The augmented reality head-up display system of claim 1, wherein the contextual graphic is a traffic light, and wherein the traffic light appears to change lighting colors to communicate a status of the traffic light.

12. The augmented reality head-up display system of claim 1, wherein the visually occluded object is one of the following: roadway signage or marking, another vehicle, a pedestrian, a bicyclist, a traffic incident, an oncoming vehicle, and road conditions requiring attention.

13. The augmented reality head-up display system of claim 5, wherein the conformal graphic is a roadway sign that changes perspective and size as the roadway sign approaches the vehicle.

14. A method for displaying graphics upon a windscreen of a vehicle by an augmented reality head-up display system, the method comprising:
   receiving, by a controller, object detection data indicating a current position of objects located within an environment surrounding the vehicle;
   receiving, by the controller, image data from one or more image-capturing devices that capture image data of the environment surrounding the vehicle;
   comparing, by the controller, the current position of the objects within the environment with a visual location of the objects within the environment determined based on image data to identify a visually occluded object located within the environment;
   in response to identifying the visually occluded object, determine a contextual graphic that signifies the visually occluded object;
   instruct a graphic projection device to generate the contextual graphic upon the windscreen of the vehicle a graphic projection device for generating images upon the windscreen of the vehicle;
   determining, by the controller, a location of a head of a driver of the vehicle and a gaze location based on driver perception data received from an eye location system;

determining, based on the driver perception data, that an out-of-range object is presently outside of a field-of-view of the driver of the vehicle; and in response to determining the out-of-range object, instructing the graphic projection device to generate the contextual graphic along a boundary of a far-field image plane, wherein the out-of-range object first becomes visible at the boundary of the far-field image plane.

15. An augmented reality head-up display system for displaying graphics upon a windscreen of a vehicle, the augmented reality head-up display system comprising:

one or more image-capturing devices that capture image data of an environment surrounding the vehicle;

a graphic projection device for generating images upon the windscreen of the vehicle, wherein the graphic projection device displays graphics upon a near-field image plane and a far-field image plane;

an eye location system; and a controller in electronic communication with the eye location system, the one or more image-capturing devices and the graphic projection device, wherein the controller executes instructions to:

receive object detection data indicating a current position of objects located within the environment surrounding the vehicle;

compare the current position of the objects within the environment with a visual location of the objects within the environment determined based on the image data to identify a visually occluded object located within the environment;

in response to identifying the visually occluded object, determine a contextual graphic that signifies the visually occluded object;

instruct the graphic projection device to generate the contextual graphic upon the windscreen of the vehicle, wherein the contextual graphic is overlaid at a specific position upon the windscreen, and wherein the visually occluded object is visible at the specific position on the windscreen once a line-of-sight of a driver of the vehicle is no longer occluded;

receive driver perception data from the eye location system;

determine a location of a head of a driver of the vehicle and a gaze location based on the driver perception data;

determine, based on the driver perception data, that an out-of-range object is presently outside of a field-of-view of the driver of the vehicle; and in response to determining the out-of-range object, instruct the graphic projection device to generate the contextual graphic along a boundary of the far-field image plane, wherein the out-of-range object first becomes visible at the boundary of the far-field image plane.

16. The augmented reality head-up display system of claim 15, wherein the out-of-range object first becomes visible at the boundary of the far-field image plane.

17. The augmented reality head-up display system of claim 15, wherein the controller executes instructions to:

determine, based on the driver perception data, that the visually occluded object is within a field-of-view of a driver of the vehicle; and in response to determining the visually occluded object is within the field-of-view of the driver of the vehicle, instruct the graphic projection device to generate the contextual graphic as a conformal graphic.

18. The augmented reality head-up display system of claim 17, wherein the controller executes instructions to:

continually adjust a perspective and a size of the conformal graphic in real-time to conform to the environment surrounding the vehicle.

19. The augmented reality head-up display system of claim 18, wherein the conformal graphic is a roadway sign that changes perspective and size as the roadway sign approaches the vehicle.

* * * * *